US008259588B2

(12) United States Patent
Selitser et al.

(10) Patent No.: US 8,259,588 B2
(45) Date of Patent: Sep. 4, 2012

(54) SYSTEM AND METHOD FOR PROCESSING COMMUNICATIONS USING SERVICE INTERCEPTORS

(75) Inventors: Boris Selitser, Castro Valley, CA (US); Jean Bovet, Menlo Park, CA (US); Sharath Rajasekar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 157 days.

(21) Appl. No.: 12/490,939

(22) Filed: Jun. 24, 2009

(65) Prior Publication Data

US 2010/0329269 A1 Dec. 30, 2010

(51) Int. Cl.
*G01R 31/08* (2006.01)
*G06F 11/00* (2006.01)
*H04L 12/28* (2006.01)
(52) U.S. Cl. ........................................ 370/241; 370/401
(58) Field of Classification Search ........................ None
See application file for complete search history.

(56) References Cited

U.S. PATENT DOCUMENTS

| | | | |
|---|---|---|---|
| 2006/0268871 A1* | 11/2006 | Van Zijst | 370/390 |
| 2007/0168336 A1* | 7/2007 | Ransil et al. | 707/3 |
| 2009/0300653 A1* | 12/2009 | Kukura et al. | 719/316 |

* cited by examiner

*Primary Examiner* — Ayaz Sheikh
*Assistant Examiner* — Sori Aga
(74) *Attorney, Agent, or Firm* — Fliesler Meyer LLP

(57) ABSTRACT

A gateway is described that performs processing of communications by employing a series of service interceptors. The interceptors can be registered in the gateway by using a configuration file. Once registered, the interceptors can be invoked in a particular sequence for the requests coming into the gateway. Each interceptor can deny the request, allow the request, abstain from processing the request and pass the request to the next interceptor specified by the sequence. The interceptors can also modify the various data associated with the request. There can be dependencies between multiple interceptors. In addition, new custom interceptors can be created and registered at the gateway to process incoming requests.

18 Claims, 6 Drawing Sheets

SYSTEM AND METHOD FOR PROCESSING COMMUNICATIONS USING SERVICE INTERCEPTORS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to telecommunications and more particularly to processing communication traffic using service interceptors.

BACKGROUND

Given the recent dramatic growth in wireless and cellular communications, more and more businesses and other entities are integrating themselves with mobile device technologies. In addition to standard voice features, modern cellular phones and similar devices provide countless other services, such as internet access, email, short messaging service (SMS) texting, digital cameras, multimedia messaging service (MMS), Bluetooth, gaming, various web-based applications and the like. As a result, telecommunication carriers and network operators have been under increased pressure to provide more and more service offerings to their subscribers. Today's network operator wants to attract new and retain customers, develop profitable new business models, improve returns and launch new services as quickly as possible. In addition, the possible competitive pressures from other entities such as internet-based providers have been a growing area of concern in this field.

Faced with these challenges, most operators expect a drastic increase in their portfolio of content and application offerings, from a handful now, to thousands and possibly even millions in the future. While some of these offerings will be developed and deployed in house, the vast majority of these new applications will likely be sourced from partners, Web applications such as social networking sites and third party service providers. These outsourced services will be deployed and executed outside of the carrier's internal network, thereby creating new challenges in security, integration and management of the environment.

To assist with these challenges, new telecommunication gateways and software applications have emerged, which are typically deployed by the network operator as part of a service development platform (SDP). These gateways usually provide features for managing the ecosystem between the operator, its internal subscriber network and various third party providers. For example, a communication services gateway may help to secure third party access to the operator's core network, provide service level agreement (SLA) enforcement, as well as perform numerous other functions.

While such gateways have done much to improve the telecommunication service environment, there still exists significant room for advancement in terms of scalability, extensibility and customization of traffic flow at the network operator. For example, the ability to customize and modularize traffic workflow that is executing through the network gateway can be desirable in many circumstances. In addition, the abilities to easily extend and modify communication flow and to centralize policy enforcement can often be advantageous. Applicants have identified the foregoing as well as other needs that currently exist in the art in coming to conceive the subject matter of the present disclosure.

SUMMARY OF THE INVENTION

In the various embodiments, a telecommunication services gateway is described that is structured as a series of service interceptors used to process communications. The interceptors can be registered in the gateway by using a configuration file. Once registered, the interceptors can be invoked in a particular sequence for the requests coming into the gateway. Each interceptor can deny the request, allow the request, abstain from processing the request and pass the request to the next interceptor specified by the sequence. The interceptors can also modify the various data associated with the request. There can be dependencies between multiple interceptors. In addition, new custom interceptors can be created and registered at the gateway to process incoming requests.

By structuring the gateway as a sequence of interceptors, a multitude of advantages can be achieved. For example, service interceptors can provide an easy way to modify the request flow, modularize and centralize policy enforcement, as well as simplify protocol-translation routing within the gateway. Various interceptors can be added to or removed from the gateway without impacting traffic flow, thereby allowing easier implementation of new functionality and overall simpler administration of the gateway.

DETAILED DESCRIPTION

Figure 1:
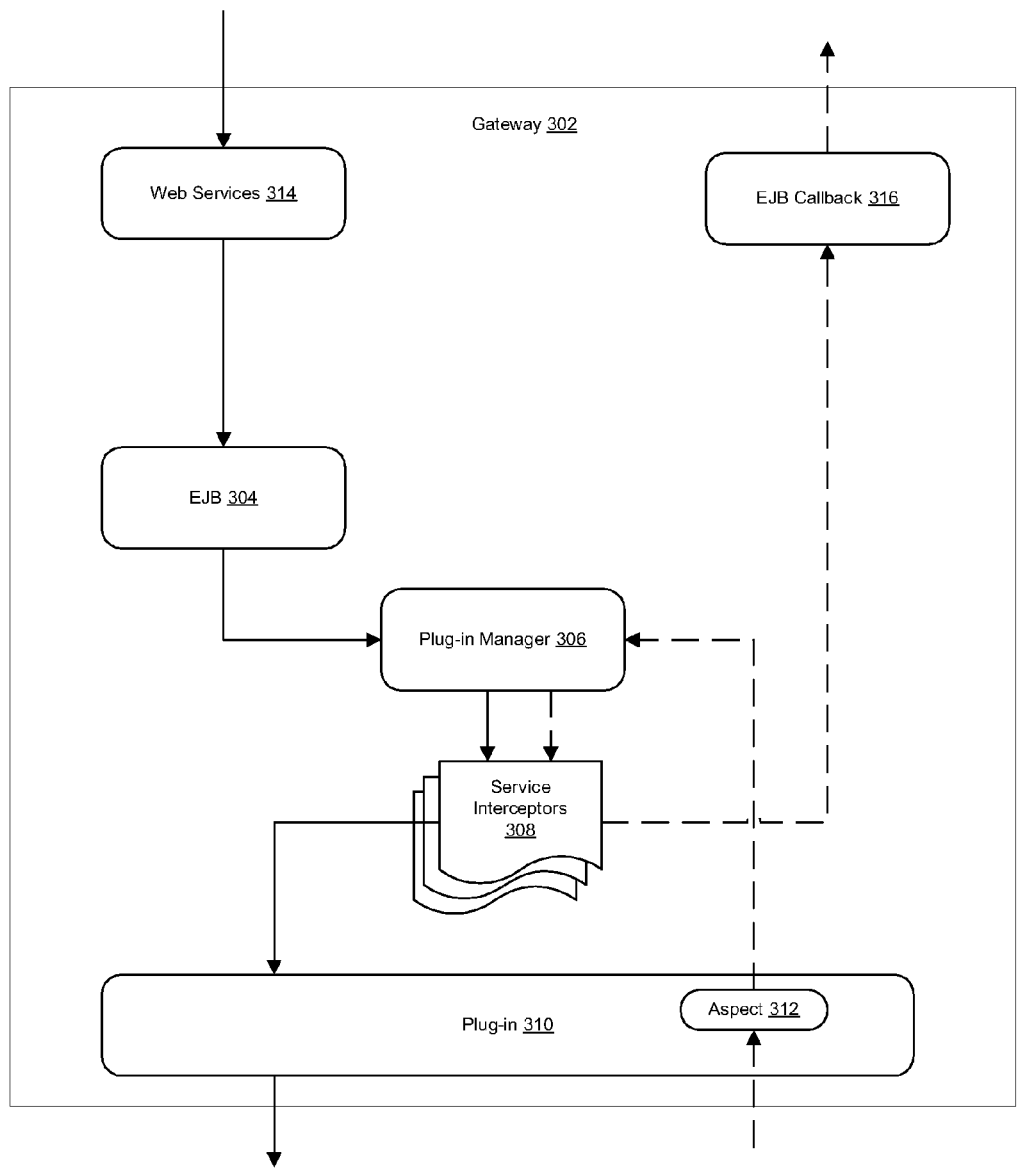
FIG. 1 is an illustration of a gateway structured as a series of service interceptors, in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server or a router. Furthermore, it can also be apparent to those skilled in the art that such components, regardless of how they are combined or divided, can execute on the same computing device or can be distributed among different computing devices connected by one or more networks or other suitable communication means.

In accordance with the embodiments of the invention, systems and methods are described for processing communications using service interceptors. The service interceptors can comprise a gateway and they can be responsible for intercepting and performing functionality on the communications flowing through the gateway. In one embodiment, a series of service interceptors are invoked in a specific sequence for each incoming request. Once invoked, each service interceptor can deny the request, allow it, abstain from processing the request and pass the request to the next service interceptor in the series. The interceptors can also perform other functionality, such as modifying data or metadata associated with the requests.

In various embodiments, the communication services gateway that hosts the service interceptors can be used to manage and translate communications flowing to and from a telecommunications network. For example, the gateway can be deployed by a mobile network operator in order to manage access to its internal telecom network by various third party service providers and external applications. The service interceptors can be used to intercept requests and other communications between the third party service providers and the internal telecommunications network of the operator and perform some processing on these requests. For example, the service interceptors may route the request to a particular plug-in that translates the request into an appropriate protocol, make decisions whether to permit or deny the request based on a service function, enforce budgets and perform various other functionality. In one embodiment, the service interceptor is an implementation of a specific interface that may be triggered during normal traffic flow through the gateway.

The service interceptors can be invoked for all northbound and southbound traffic in the gateway. In various embodiments, the southbound traffic includes requests originating at the third party service providing application and directed to access the internal network of the operator. The northbound traffic, on the other hand, includes requests that originate in the internal subscriber network. Once a request is received to the gateway, a series of designated interceptors process the request in sequence (e.g. perform policy enforcement and routing) and the request can be directed to the intended recipient. Some typical use cases of the service interceptors can be to deny the request if the user didn't subscribe to a particular service, deny the request if the PIN is not valid, deny the request if there is not enough funds, verify that the request parameters are valid, perform arguments manipulation like aliasing, as well as perform numerous other functions.

In various embodiments, each interceptor can be registered with an interceptor manager. Once it is registered, the interceptor will be invoked for each request. Each interceptor can be placed in an interceptors list at a particular index specified during registration. The interceptor manager can then invoke the first interceptor and each interceptor can in turn invoke the next one, as in a chain. In addition, the interceptor can modify this request flow by either throwing an exception (used to deny the request) or by returning a value directly, instead of calling the next interceptor (used to allow the request if it is deemed to be fulfilled).

The interceptor can be registered with the interceptor manager by using a configuration file, such as an extensible markup language (XML) file. In one embodiment, the registration can specify an interception point and an index for each interceptor. The interception point indicates when the interceptors should be invoked. The index is used to indicate the location of the interceptor relative to the other interceptors for the same position. The registration of interceptors is described in further detail below, in conjunction with FIG. 2.

Once registered, different chains of interceptors can be invoked for various requests going through the gateway. In one embodiment, there are multiple entry points for receiving a request to the gateway. Depending on the entry point, a different chain of interceptors can be invoked, as registered in the configuration file. Furthermore, the chains of interceptors can be reassembled and reconfigured depending on the needs of the particular operator or network.

In the event of network errors, it can also be desirable to be able to retry a request with another instance of a plug-in. As used in this disclosure, a plug-in is a component that translates a request into a particular protocol suitable to its intended recipient in the telecom network. In the case of network errors, an interceptor can be extended to handle the retry mechanism at the plug-in level. Furthermore, various custom interceptors can be created according to the particular needs of a network operator. Once created, the custom interceptor can be registered with the interceptor manager and subsequently invoked for each request flowing through the gateway.

In this manner, service interceptors can provide an easy way to modify the request flow, modularize and centralize policy enforcement, as well as simplify plug-in routing within the gateway. The service interceptors and the telecommunications gateway are described in more detail below, along with the illustrated figures.

FIG. 1 is an illustration of a gateway structured as a series of service interceptors, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the service interceptors 308 can be used to create a telecommunications gateway 302. The interceptors can contain the processing logic of the gateway that is applied to the traffic flow. In one embodiment, the interceptors are invoked for each request by the plug-in manager 306 during normal traffic flow through the gateway. The plug-in manager is a component that manages the invocation of the various plug-ins for protocol translation of the requests.

In the figure, the southbound requests are shown as a solid arrow line, while the northbound requests are shown by a broken line. For both types of requests, a series of interceptors can be invoked within the gateway. For example, for southbound traffic, the request can be received via a Web services interface 314 from an external application (e.g. web application). Once received, the request can be routed to an EJB 304 in the network tier 302 and subsequently be passed to the plug-in manager 306. The plug-in manager can invoke the series of interceptors 308, which can result in the appropriate plug-in 310 being selected for the request.

For northbound traffic, a network initiated request can be received via an aspect 312 and be routed to the plug-in manager 306. Once again, the plug-in manager can invoke a series of interceptors. In various embodiments, the particular selection and sequence of interceptors can be different for northbound traffic than southbound traffic. For example, some of the interceptors which are invoked for southbound requests, would not be called for northbound traffic, and vice versa. Once the northbound request is processed by all applicable interceptors, it can be passed to the access tier via an EJB callback 316 or a similar mechanism.

In various embodiments, the service interceptors 306 are plain old Java objects (POJOs) that register with an appropriate entity in the gateway. Once registered, the interceptors are invoked in a specific order for each request (application initiated and network initiated). In one embodiment, the interceptors are inserted into a numbered list (the position indicated during registration) and called in sequence according to that list. In the preferred embodiment, the last interceptor that is executed will either invoke the appropriate plug-in (for southbound traffic) or the appropriate application (for northbound traffic). In one embodiment, the interceptor can return a value that will be returned to the caller of the first interceptor.

In various embodiments, the service interceptors may respond or react to requests. For example, an interceptor may deny, abstain from processing or call the next interceptor in the list. In addition, the interceptor may decorate a request with various data by modifying the context (e.g. data associated with the request that is passed between the interceptors). For example, an interceptor may add/update protocol data before invoking a particular plug-in and forwarding the request to the network.

More specifically, in one embodiment, the decisions within the interceptor are expressed in the following ways:
 a. To proceed, continue down the invocation chain by calling the next interceptor;
 b. To break the chain due to a violation. For example if a parameter in the request was out of bounds, or if usage policies were violated, the request can be aborted, throwing a PluginDenyException; and
 c. To break the chain due to the request having been fulfilled. For example, if there is no need to call the plug-in or the application in order to fulfill the needs of the request, the interceptor may simply return the request.

In various embodiments, some examples of service interceptors are shown in the table below. It should be noted, however that this list of interceptors should not be construed in any way limiting or exhaustive and that many other possible combinations of interceptors are possible within the scope of the present embodiments.

| Interceptor | Description |
| --- | --- |
| EnforceApplicationState | Enforces the application state, such as by checking whether the application is logged in. |
| EnforceSpAppBudget | Check to see if the service provider and/or the application have enough budget. |
| ValidateRequestUsingRequestFactory | Validates the request using the RequestFactory corresponding to the type of plug-in the request is intended for. |
| CreatePluginList | Creates the list of plug-ins for the given request. |
| RemoveInactivePlugin | Remove any plug-in that is not active |
| FilterPluginListUsingCustomMatch | Invokes the custom match method of each plugin: this method can either remove the plug-in or mark it as being required. |
| RoundRobinPluginList | Perform a pseudo round-robin of the list of all available plug-ins. |
| EnforceNodeBudget | Make sure that the node (global and service provider) for each required plug-in has enough budget |
| InvokeServiceCorrelation | Invokes the functionality that correlates service invocations. This feature can associate multiple service invocations such that certain operations can be performed based on correlating multiple calls within the gateway. |
| FindAndValidateSLAContract | Make sure that there is an SLA for the given request type, check that the date is valid, and the like. |
| CreatePolicyData | Create the policy data needed by other interceptors. |
| CheckMethodParametersFromSLA | Check that the request parameters are allowed as specified in the SLA. |
| EnforceBlackListedMethodFromSLA | Deny the request based on a method blacklist as specified in the SLA. |
| InjectValuesInRequestContextFromSLA | Add any optional request context attribute as specified in the SLA. |
| EvaluateILOGPolicy | Evaluate any custom ILOG rules. |
| InvokePlugin | Invoke the plug-in(s). This should be the last interceptor for a southbound request. |
| InvokeApplication | Invoke the application (EJB Callback). This should be the last interceptor for a northbound request. |

| Interceptor | Description |
| --- | --- |
| RetryPlugin | Will retry the remaining eligible plug-ins if a plug-in threw the PluginRetryException. |
| RemoveOptional | Removes the optional plug-ins in a plug-in list of eligible plug-ins in a RequestInfo - if a required plug-in exists. |

Furthermore, in various embodiments, there can be dependencies between some of the service interceptors. For example, the RemoveInactivePlugin interceptor can depend on the CreatePluginList interceptor, the EnforceNodeBudget interceptor can depend on EnforceSpAppBudget interceptor and the like.

In one embodiment, each interceptor is packaged and deployed individually, in a separate file such that they can be added, removed or upgraded in real-time without impacting traffic flowing through the system.

Figure 2:
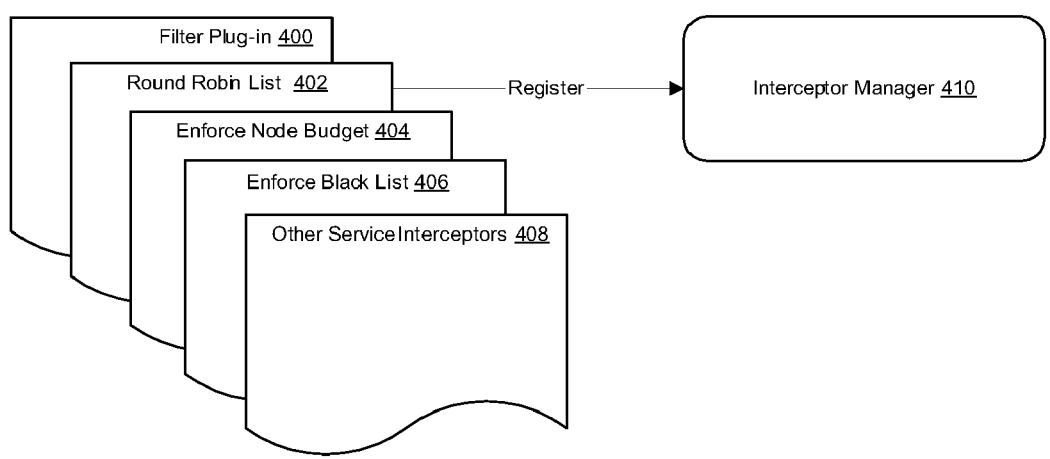
FIG. 2 is an illustration of interceptor registration, in accordance with various embodiments of the invention.

FIG. 2 is an illustration of interceptor registration, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same In various embodiments, the interceptors to be invoked are registered with the interceptor manager by using a configuration file. Each interceptor described in the configuration file will be registered at the specified interception point (position) and index. In one embodiment, the interception point indicates when the interceptors are to be invoked. For example:

a. MT_NORTH—the interceptor should be invoked before the north interface of the plug-in is invoked for southbound requests; or b. MO_NORTH—for northbound traffic, the interceptor should be invoked before the application is invoked from the north interface of the plug-in.

The index, on the other hand, indicates the location of the interceptor relative to the other interceptors for the same position (interception point). In one embodiment, the index can be any integer (positive or negative) and the interceptors will be executed from the lowest to the biggest index. As a non-limiting example, the following can be a possible format of a configuration file used to register various interceptors with the interceptor manager:

```
<?xml version="1.0" encoding="UTF-8"?>
<interceptor-config xmlns="http://www.bea.com/ns/wlng/30"
        xmlns:xsi="http://www.w3.org/2001/XMLSchema-instance"
        xsi:schemaLocation="http://www.bea.com/ns/wlng/30 config.xsd">
  <position name="MT_NORTH">
    <interceptor class="com.bea.wlcp.wlng.interceptor.EnforceApplicationState" index="100"/>
    <interceptor class="com.bea.wlcp.wlng.interceptor.EnforceSpAppBudget" index="200"/>
    <interceptor class="com.bea.wlcp.wlng.interceptor.ValidateRequestUsingRequestFactory"
        index="300"/>
    <interceptor class="com.bea.wlcp.wlng.interceptor.CreatePluginList" index="400"/>
    <interceptor class="com.bea.wlcp.wlng.interceptor.RemoveInactivePlugin" index="500"/>
    <interceptor class="com.bea.wlcp.wlng.interceptor.RemoveInvalidAddressPlugin"
        index="600"/>
    <interceptor class="com.bea.wlcp.wlng.interceptor.RemoveOptional" index="700"/>
    <interceptor class="com.bea.wlcp.wlng.interceptor.FilterPluginListUsingCustomMatch"
        index="700"/>
    <interceptor class="com.bea.wlcp.wlng.interceptor.RoundRobinPluginList" index="900"/>
    ...
  </position>
  <position name="MO_NORTH">
    <interceptor class="com.bea.wlcp.wlng.interceptor.EnforceApplicationState" index="100"/>
    <interceptor class="com.bea.wlcp.wlng.interceptor.InvokeServiceCorelation" index="200"/>
    <interceptor class="com.bea.wlcp.wlng.interceptor.CreatePolicyData" index="300"/>
    <interceptor class="com.bea.wlcp.wlng.interceptor.EvaluateILOGPolicy" index="400"/>
    <interceptor class="com.bea.wlcp.wlng.interceptor.InvokeApplication" index="500"/>
  </position>
</interceptor-config>
``` computing device or can be distributed among different computing devices connected by one or more networks or other suitable communication means.

As illustrated, a plurality of interceptors 400, 402, 404, 406, 408 can be registered with an entity such as an interceptor manager 410. The interceptor manager can be any executable component within the gateway responsible for invoking an interceptor(s) that have been registered. In one embodiment, the interceptor manager invokes the first service interceptor and the invoked interceptor invokes the next interceptor and so forth, as in a chain.

Figure 3:
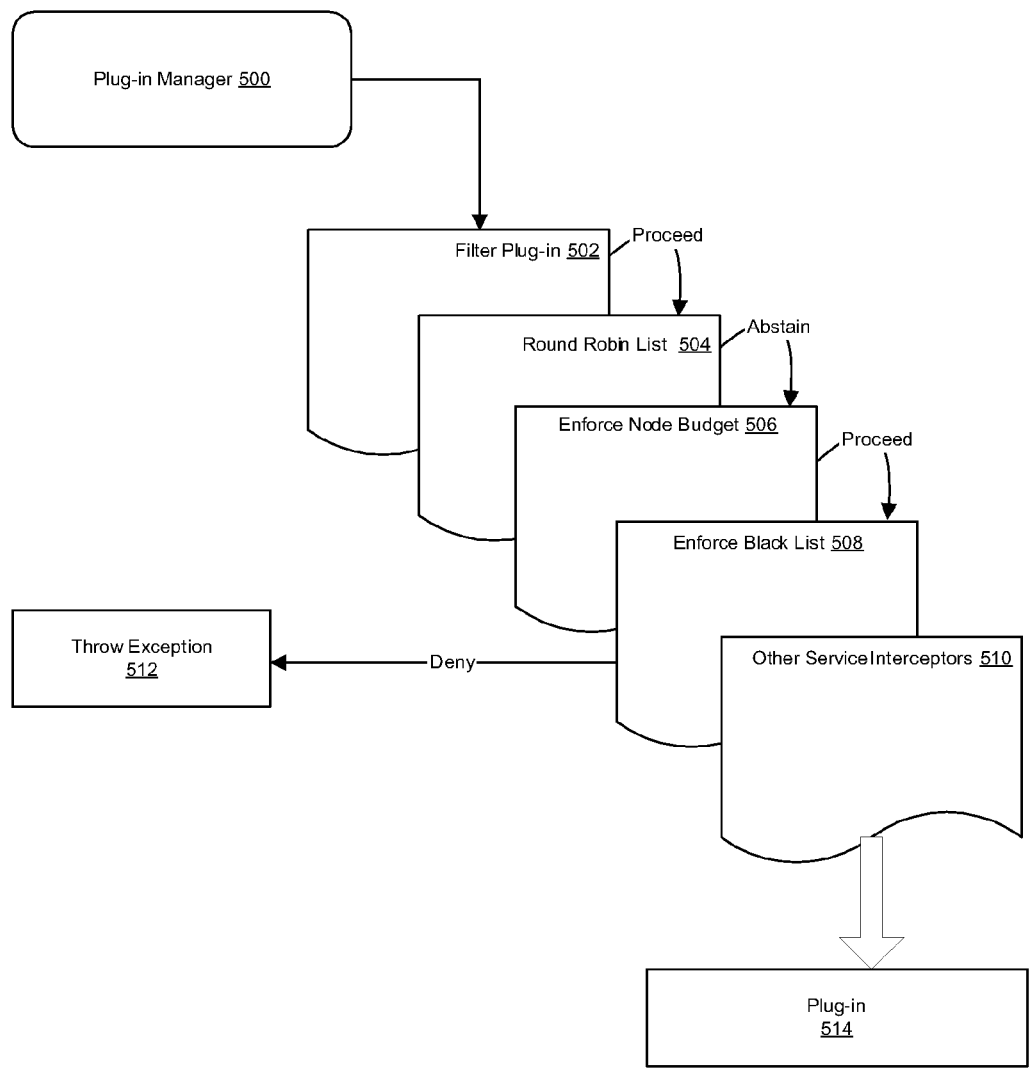
FIG. 3 is an illustration of invoking service interceptors in a chain, in accordance with various embodiments of the invention.

FIG. 3 is an illustration of invoking service interceptors in a chain, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the plug-in manager can invoke the first interceptor such as FilterPlugin 502, which can in turn invoke the next interceptor in the series 504 and so on. The series of invoked interceptors 502, 504, 506, 508, 510 are specified in the configuration file and can comprise a subset of all available interceptors in the gateway. Each interceptor may allow the request, abstain from processing the request, invoke the next interceptor in the sequence or deny the request by throwing an exception 512. In one embodiment, the last interceptor for southbound traffic should invoke the selected plug-in 514.

Figure 4:
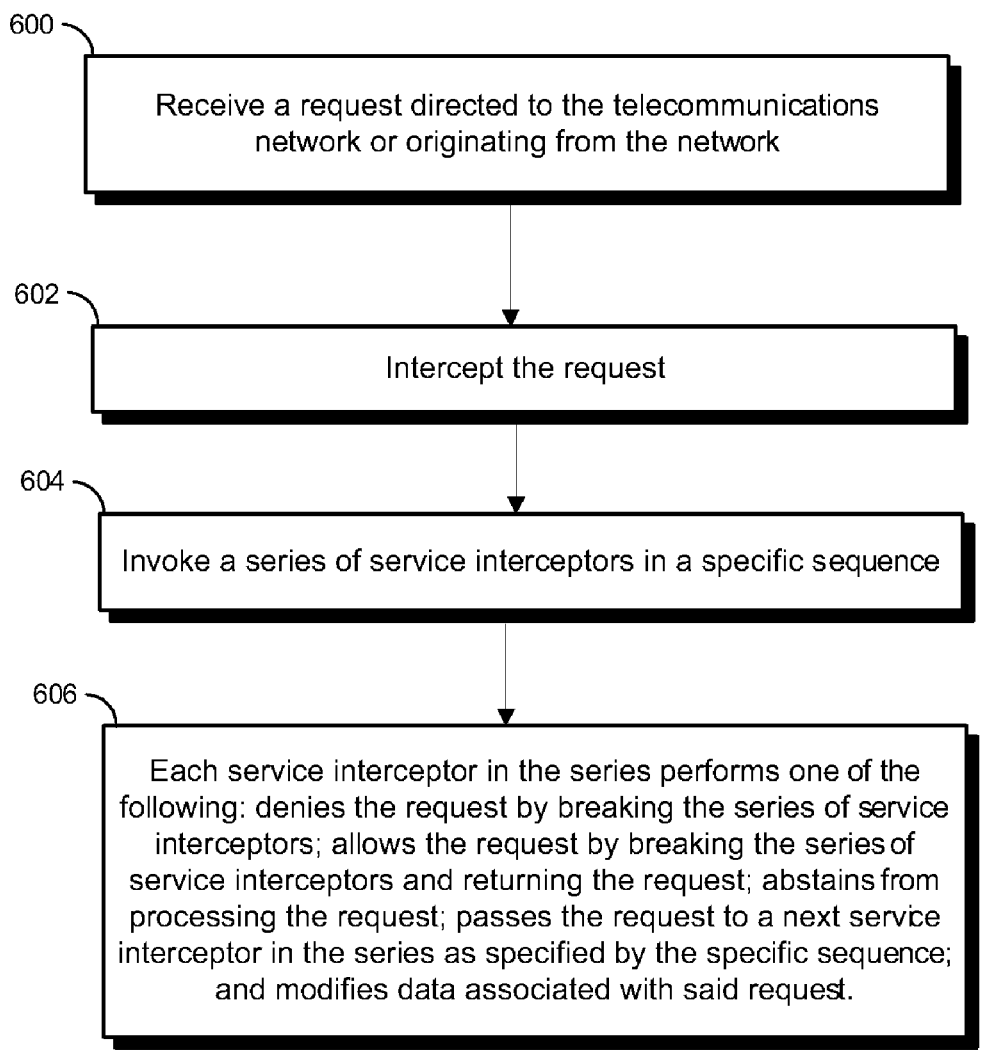
FIG. 4 is a high level flow chart diagram of the process for invoking service interceptors, in accordance with various embodiments of the invention.

FIG. 4 is a high level flow chart diagram of the process for invoking service interceptors, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 600, a request can be received from a telecommunications network or directed to a telecommunication network. For example, the request can originate from an entity within the internal telecom network of an operator or from an external third party Web application. In step 602, the request is intercepted and in step 604, a series of service interceptors are invoked in a specific sequence. Each service interceptor in the sequence can deny the request, allow the request, abstain from processing, pas the request to a next interceptor or modify data associated with the request, as shown in step 606.

Figure 5:
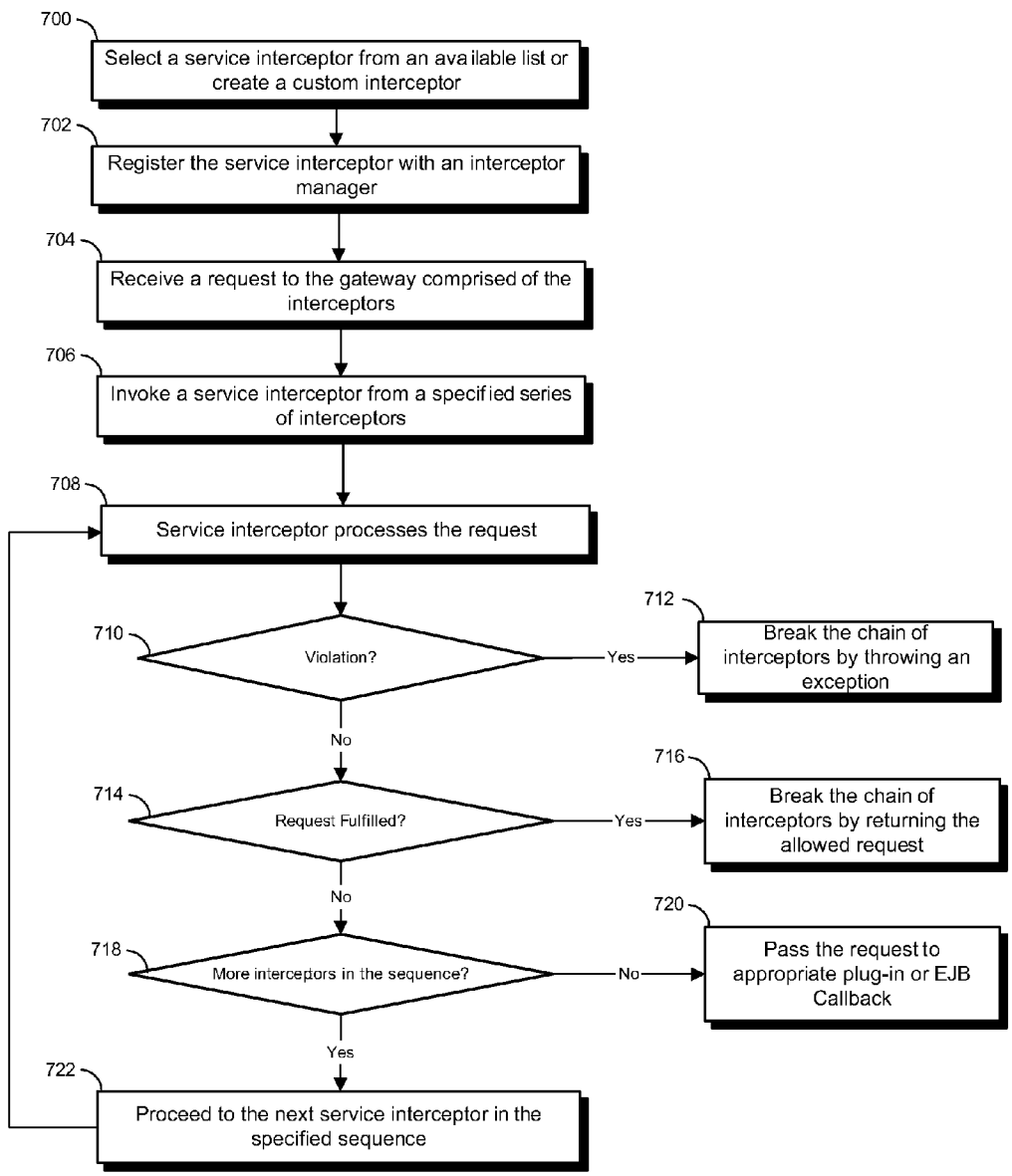
FIG. 5 is a more specific flow chart diagram of the process for invoking service interceptors, in accordance with various embodiments of the invention.

FIG. 5 is a more specific flow chart diagram of the process for invoking service interceptors, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 700, a service interceptor can either be selected from an existing list or a custom interceptor can be created as needed. In step 702, the interceptor is registered with the managing entity within the gateway. For example, the registration can be performed by specifying, in an XML file, which interceptors are to be invoked for various requests. When a request is received to the gateway (step 704), the registered interceptor(s) can be invoked in a specified series, as shown in step 706.

Once invoked, each interceptor can perform its specific processing on the request, as shown in step 708. For example, the processing can involve checking and enforcing appropriate SLA-based policies, selecting the appropriate plug-ins, denying blacklisted methods, and the like. Steps 710-720 illustrate a possible logic flow between the interceptors.

As an illustration, in step 710, if the request violates a particular SLA or other policy, the chain of interceptors can be broken by throwing an exception, as shown in step 712. Furthermore, in step 714, if the request is fulfilled without the need to invoke any plug-in or application, the chain of interceptors can be broken by returning the request, as shown in step 716.

In step 718, it can be determined whether there are anymore interceptors in the sequence that should be invoked. If there are no more interceptors, the request would preferably be passed to the appropriate plug-in (for southbound traffic) or to the external application via an EJB callback (for northbound traffic), as shown in step 720. If there are more interceptors to be invoked, the processing can proceed to the next interceptor in the sequence, as shown in step 722.

Figure 6:
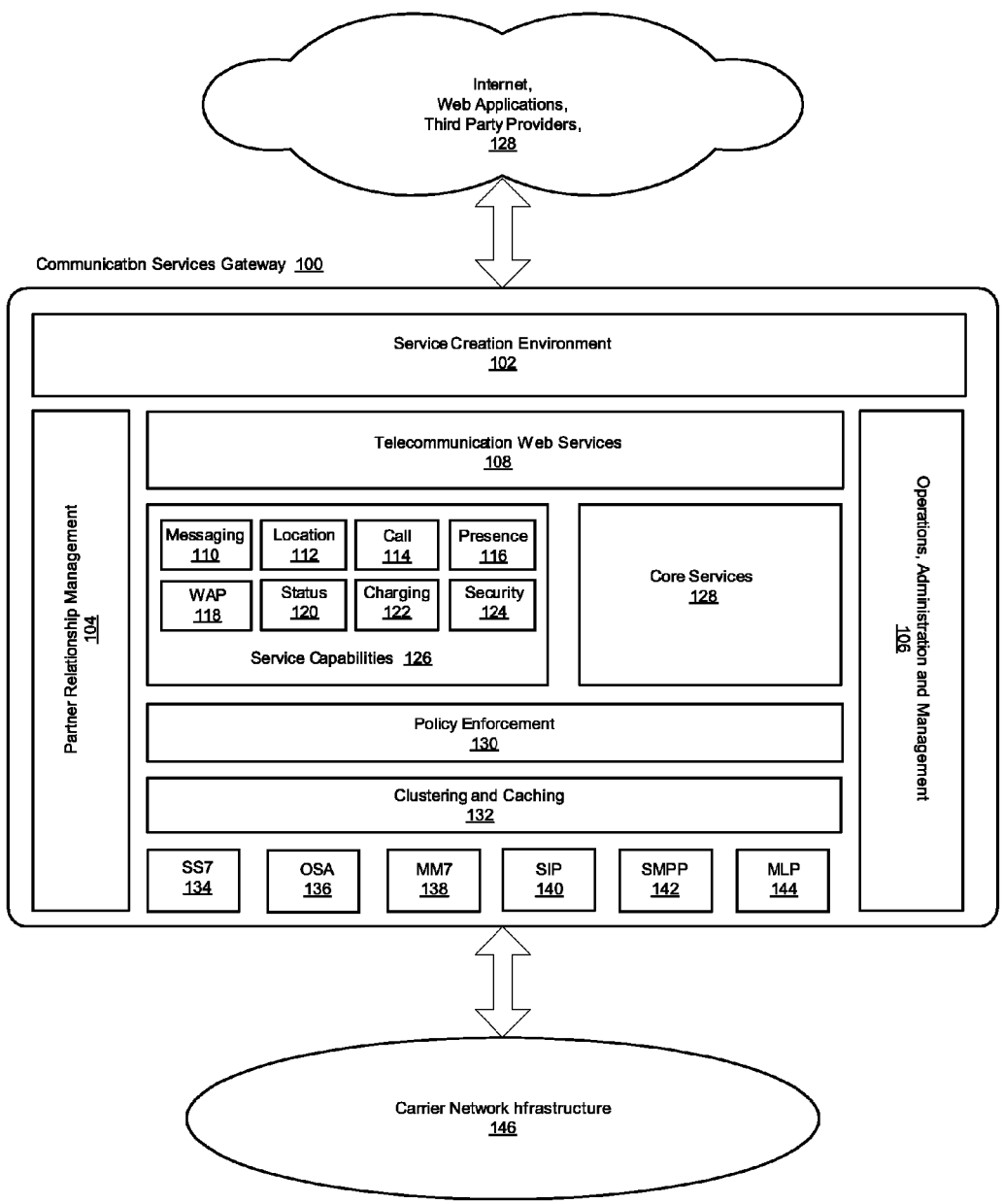
FIG. 6 is an illustration of the various functional components of a communication services gateway that can host the service interceptors, in accordance with various embodiments of the invention.

FIG. 6 is an illustration of the various functional components of a communication services gateway that can host the service interceptors, in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the communication services gateway 100 can be deployed by a network operator in order to manage traffic flow to and from the telecommunications network 146 by implementing the service interceptors described herein. In other words, the gateway is an entity deployed between the internal network of the operator and any client and/or device 128 that wishes to access the network 146. In one embodiment, the communication services gateway is a set of software applications that perform some services to the requests flowing to/from the network 146. In alternative embodiments, the gateway can be implemented as hardware, firmware, or any combination thereof. In either case, the gateway can translate communications initiated by clients (e.g. Web applications) via Web services into the appropriate network protocols and vice versa. For example, in one embodiment, the communication services gateway exposes the following service enablers as telecommunication Web Services 108:

- Call Control (Parlay X), including Third-party call control, call notification and audio call;
- Messaging (Parlay X), including short messaging service (SMS), multimedia messaging service (MMS) and EWS wireless application protocol (WAP) push;
- Location (Parlay X), including MLP-based terminal location;
- Presence (Parlay X), including session initiation protocol (SIP)-based terminal status; and
- Subscriber Profile (Extended Web Services)—lightweight directory access protocol (LDAP)-based user profile.

On the carrier network side, the web services can be translated into protocols and standards such as signaling system 7 (SS7) 134, open service access (OSA) 136, MM7 138, session initiation protocol (SIP) 140, short message peer to peer protocol (SMPP) 142, MLP 144, and the like.

In addition to performing various protocol translations, the communication services gateway 100 can provide an integrated service exposure platform that combines policy enforcement, comprehensive web services, partner relationship management, and an extensible network adaptation framework. The gateway can facilitate third party service provider 128 access to the carrier network 146 in a controlled, secure and optimized manner. It can also protect and manage third party access to the operator's core network resources, such as messaging 110, call control 114, location 112, subscriber profile.

The features provided by the gateway include a service level agreement (SLA)-based policy enforcement engine 130. The policy enforcement engine upholds third party partner SLAs at runtime. Furthermore, the policy engine can provide traffic management and traffic shaping capabilities in order throttle and shape traffic flowing through the gateway. In one embodiment, the policy enforcement engine identifies the originator, the entitlement associated to that originator and the real time usage pattern of the originator. Based on this information, the engine can enforce the originator's entitlements in real time.

The various features of the gateway can also include clustering and caching 132, as well as geographical redundancy across multiple domains. For example, the gateway can be deployed in a multi-tier environment that comprises an access tier and a network tier. The two-tier deployment will be described in further detail below, in conjunction with FIG. 2. In addition, the gateway can provide various service capabilities 126, such as messaging 110, location 112, call 114, presence 116, wireless application protocol (WAP) 118, status 120, charging 122 and security 124.

In various embodiments, the communication services gateway can provide third party partner relationship management 104. For example, a standard web service interface can be provided that integrates with portal applications for third party partners self service and network operator administration. This feature would enable partners of the network operator to self-administer and manager their SLAs with the operator, including the on-boarding of additional services.

In some embodiments, the core platform services 128 of the gateway can include alarms, caching, call detail records (CDR), charging, budget, accounts, events, geo-redundancy, logging, policy, resource, statistics, storage, timer and transactions. In addition, the service creation environment 102 can provide web and application developers, system administrators and service providers with a set of service creation, simulation and testing capabilities. The service creation suite 102 can comprise a software development kit (SDK) that can be used to rapidly create new services, as well as to customize and extend the platform to meet the unique requirements of the particular telecom network.

The operations, administration and management component 106 can provide the installation and configuration wizards, as well as a web-based graphical user interface (GUI) for controlling the servers; provisioning, configuring and managing assets; and viewing alarms.

It is noted, however, that the above described features and services of the communication services gateway are provided purely for purposes of illustration and are not intended to be limiting of the invention in any way. The particular set of features illustrated in FIG. 6 is only one example of many such sets that are possible and the gateway is not limited to this or other specific implementations.

In various aspects, the embodiments described throughout this disclosure encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments also include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:
1. A system, comprising:
a gateway for intercepting request traffic, said gateway including a plurality of service interceptors that intercept a request flowing through said gateway in a particular sequence, wherein each of the plurality of interceptors performs at least one of the following functions upon having intercepted said request
deny the request,
allow the request,
abstain from processing the request,
pass the request to a next service interceptor, and
modify data associated with said request;
a configuration file containing data that specifies an interception point and an index for each of said plurality of service interceptors;
an interceptor manager that reads the configuration file to register the plurality of service interceptors for the request, wherein the service interceptors are invoked for said request according to registration in said configuration file; and
wherein after a request is received, a particular service interceptor is invoked and the particular service interceptor can
determine whether the request violates a particular policy, and deny the request if it violates the particular policy, determine whether the request has been fulfilled without a need to invoke a plug-in or an application, and return the request if it has been fulfilled, determine whether there are additional service interceptors in the particular sequence that should be invoked, and if there are no more interceptors, pass the request to an appropriate plug-in or application, and if there are more interceptors to be invoked, pass the request to a next service interceptor in the particular sequence.

2. The system of claim 1, wherein a plurality of service interceptors are executed in a specific sequence for all requests flowing through said gateway.

3. The system of claim 1, wherein the index indicates a location of a service interceptor relative to other service interceptors.

4. The system of claim 1, wherein the-interception point indicates when the one or more service interceptors will be invoked.

5. The system of claim 1, wherein the service interceptor is an implementation of a specific interface that is triggered during normal traffic flow through the gateway.

6. The system of claim 1, wherein each service interceptor is packaged individually such that each service interceptor can be added, removed or upgraded from the sequence in real time without impacting traffic flow through the gateway.

7. The system of claim 1, further comprising:
a context containing data shared by the service interceptors, the data specifying one or more of the following: body of the request, credentials of a requestor, destination of the request, an interception point and next interceptor in the execution order.

8. The system of claim 1, wherein the gateway contains a series of service interceptors and wherein a new customized service interceptor is added to said series for processing requests flowing through the gateway.

9. The system of claim 1, wherein the one or more service interceptors include one or more of the following:
a service interceptor that enforces service provider or application budget;
a service interceptor that performs plug-in selection;
a service interceptor that performs round robin plug-in selection;
a service interceptor that enforces cluster node service level agreement (SLA) budget;
a service interceptor that enforces black listed methods from the SLA; and
a service interceptor that performs iLOG policy evaluation.

10. A method for processing communications using interceptors, said method comprising:
storing a set of data into a configuration file, said data specifying an interception point and an index for each of a plurality of service interceptors;
reading a configuration file by an interceptor manager to register the plurality of service interceptors for the request based on said data contained in the configuration file;
intercepting a request either from originating in a telecommunications network or directed to be received in said telecommunications network;
invoking the plurality of service interceptors for the request according to the registration specified in said configuration file, said service interceptors being executed in a specific sequence, wherein each service interceptor in said series performs at least one of the following denies the request by breaking the series of service interceptors,
allows the request by breaking the series of service interceptors and returning the request,
abstains from processing the request,
passes the request to a next service interceptor in the series as specified by the specific sequence, and
modifies data associated with said request; and
after a request is received, invoking a particular service interceptor and
determining whether the request violates a particular policy, and denying the request if it violates the particular policy,
determining whether the request has been fulfilled without a need to invoke a plug-in or an application, and returning the request if it has been fulfilled,
determining whether there are additional service interceptors in the particular sequence that should be invoked, and
if there are no more interceptors, passing the request to an appropriate plug-in or external application, and
if there are more interceptors to be invoked, passing the request to a next service interceptor in the particular sequence.

11. The method of claim 10, wherein the index indicates a location of a service interceptor relative to other service interceptors.

12. The method of claim 10, wherein the interception point indicates when a service interceptor will be invoked.

13. The method of claim 10, wherein a service interceptor is an implementation of a specific interface that is triggered during normal traffic flow through a gateway.

14. The method of claim 10, wherein each service interceptor is packaged individually such that each service interceptor can be added, removed or upgraded in the sequence in real time without impacting request traffic flow.

15. The method of claim 10, further comprising:
employing a context that contains data for said service interceptors, the data specifying one or more of the following
body of the request,
credentials of a requestor,
destination of the request, and
an interception point and next interceptor in the sequence.

16. The method of claim 10, further comprising:
generating a new customized service interceptor and adding the new customized service interceptor to the series for processing requests flowing through a gateway.

17. The method of claim 10, wherein the series of service interceptors include one or more of the following:
a service interceptor that enforces service provider or application budget;
a service interceptor that performs plug-in selection;
a service interceptor that performs round robin plug-in selection;
a service interceptor that enforces cluster node service level agreement (SLA) budget;
a service interceptor that enforces black listed methods from the SLA; and
a service interceptor that performs iLOG policy evaluation.

18. A non-transitory computer-readable medium storing one or more sequences of instructions for processing communications using interceptors, which instructions, when executed by one or more processors, cause the one or more processors to carry out the steps of:

storing a set of data into a configuration file, said data specifying an interception point and an index for each of a plurality of service interceptors;

reading a configuration file by an interceptor manager to register the plurality of service interceptors for the request based on said data contained in the configuration file;

intercepting a request either from originating in a telecommunications network or directed to be received in said telecommunications network;

invoking the plurality of service interceptors for the request according to the registration specified in said configuration file, said service interceptors being executed in a specific sequence, wherein each service interceptor in said series performs at least one of the following denies the request by breaking the series of service interceptors, allows the request by breaking the series of service interceptors and returning the request, abstains from processing the request, passes the request to a next service interceptor in the series as specified by the specific sequence, and modifies data associated with said request; and after a request is received, invoking a particular service interceptor and determining whether the request violates a particular policy, and denying the request if it violates the particular policy, determining whether the request has been fulfilled without a need to invoke a plug-in or an application, and returning the request if it has been fulfilled, determining whether there are additional service interceptors in the particular sequence that should be invoked, and if there are no more interceptors, passing the request to an appropriate plug-in or external application, and if there are more interceptors to be invoked, passing the request to a next service interceptor in the particular sequence.

\* \* \* \* \*

UNITED STATES PATENT AND TRADEMARK OFFICE
CERTIFICATE OF CORRECTION

| | | |
|---|---|---|
| PATENT NO. | : 8,259,588 B2 | Page 1 of 1 |
| APPLICATION NO. | : 12/490939 | |
| DATED | : September 4, 2012 | |
| INVENTOR(S) | : Selitser et al. | |

It is certified that error appears in the above-identified patent and that said Letters Patent is hereby corrected as shown below:

On sheet 6 of 6, in figure 6, Box No. 146, line 1, delete "hfrastructure" and insert -- infrastructure --, therefor.

In column 13, line 19, in Claim 4, delete "the-interception" and insert -- the interception --, therefor.

Signed and Sealed this
Eighteenth Day of December, 2012

David J. Kappos
*Director of the United States Patent and Trademark Office*